US006906754B1

(12) United States Patent
Yerazunis et al.

(10) Patent No.: US 6,906,754 B1
(45) Date of Patent: Jun. 14, 2005

(54) ELECTRONIC DISPLAY WITH COMPENSATION FOR SHAKING

(75) Inventors: William S. Yerazunis, Acton, MA (US); Darren L. Leigh, Belmont, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 507 days.

(21) Appl. No.: 09/666,757

(22) Filed: Sep. 21, 2000

(51) Int. Cl.[7] .......... H04N 5/04; H04N 9/44
(52) U.S. Cl. .......... 348/511; 348/747; 348/739
(58) Field of Search .......... 348/511, 553, 348/571, 578, 580, 739, 208; 345/121, 672; H04N 5/04, 9/44

(56) References Cited

U.S. PATENT DOCUMENTS

| | | | | | |
|---|---|---|---|---|---|
| 4,891,705 | A | * | 1/1990 | Suzuki et al. | 348/511 |
| 4,916,536 | A | * | 4/1990 | Kerr et al. | 348/139 |
| 5,528,555 | A | | 6/1996 | Santos et al. | 367/22 |
| 5,631,427 | A | | 5/1997 | Bridges | 73/658 |
| 5,742,356 | A | | 4/1998 | Suzuki | 348/607 |
| 5,801,767 | A | * | 9/1998 | Wu | 348/190 |
| 6,122,959 | A | * | 9/2000 | Hoshal et al. | 73/489 |
| 6,211,855 | B1 | * | 4/2001 | Kim | 345/127 |
| 6,317,114 | B1 | * | 11/2001 | Abali et al. | 345/121 |

OTHER PUBLICATIONS

"Apparatus for Detecting and Correcting Excessive Vibration in a Disk File"; IBM Technical Disclosure Bulletin, Nov. 1987, pp 81–82.

* cited by examiner

*Primary Examiner*—John Miller
*Assistant Examiner*—Trang U. Tran
(74) *Attorney, Agent, or Firm*—Dirk Brinkman; Andrew J. Curtin

(57) ABSTRACT

A display device includes a display screen, and horizontal and vertical display signals. The horizontal and vertical display signals are to render an image on the display screen. A first and second accelerometers are directly coupled to the display screen. First and second compensation circuits convert acceleration in horizontal and vertical directions respectively to x- and y-compensation signals. First and second adders combine the x- and y-compensation signals with the horizontal and vertical display signals to dynamically adjust a location of the image on the display screen while the display device is subject to movement.

8 Claims, 4 Drawing Sheets

ELECTRONIC DISPLAY WITH COMPENSATION FOR SHAKING

FIELD OF THE INVENTION

The present invention relates generally to electronic display devices, and more particularly to compensating the output while shaking the devices.

BACKGROUND OF THE INVENTION

Numerous techniques are known to detect shaking in cameras and to stabilize the acquired images when shaking is detected. Many of these techniques use accelerometers. U.S. Pat. No. 5,448,510 "Camera shake detection apparatus" issued to Murakoshi on May 15, 1984 sounds an alarm when excessive shaking might result in a blurred image. U.S. Pat. No. 5,758,202 "Camera capable of reducing image blur" to at Amanuma et al. issued on May 26, 1998. Accelerometers have also been used to prevent damage due to shaking in disk drives in portable computers, U.S. Patent. Other systems where vibrational noise is reduced include towed sensor arrays, U.S. Pat. No. 5,528,555. All of these devices deal with the problem of reducing noise due to shaking in input type of devices.

There is also a need to reduce effects due to shaking in output devices such as electronic displays, e.g., CRTs, LCD panels, LEDs, plasma displays, and the like. Particularly now that a large number of these devices are used in mobile electronic appliances such as cellular phones laptops, handheld computers, digital display devices in cars, buses, trucks, planes, and boats. It is difficult to read these displays under shaky conditions.

Therefore, there is a need for apparatus and methods for testing the shock and vibrational loads imposed on display devices and to compensate for this shaking. This need exists particularly for display devices used in mobile electronic appliances.

SUMMARY OF THE INVENTION

A display device includes a display screen, and horizontal and vertical display signals. The horizontal and vertical display signals are used to render an image on the display screen. A first and second accelerometers are mechanically coupled to the display screen. First and second compensation circuits convert acceleration in horizontal and vertical directions respectively to x- and y-compensation signals. First and second adders combine the x- and y-compensation signals with the horizontal and vertical display signals to dynamically adjust a location of the image on the display screen while the display device is subject to movement.

In a first embodiment, the display signals are deflection signals of a cathode ray tube and the compensation circuits operate in an analog mode. In a second embodiment, the display signals are address signals of a digital display panel, and the compensation circuits operate in a digital mode. In a third embodiment, a predictive controller is included, to model and anticipate the movement of the display device.

DETAILED DESCRIPTION OF PREFERRED EMBODIMENTS

Figure 1:
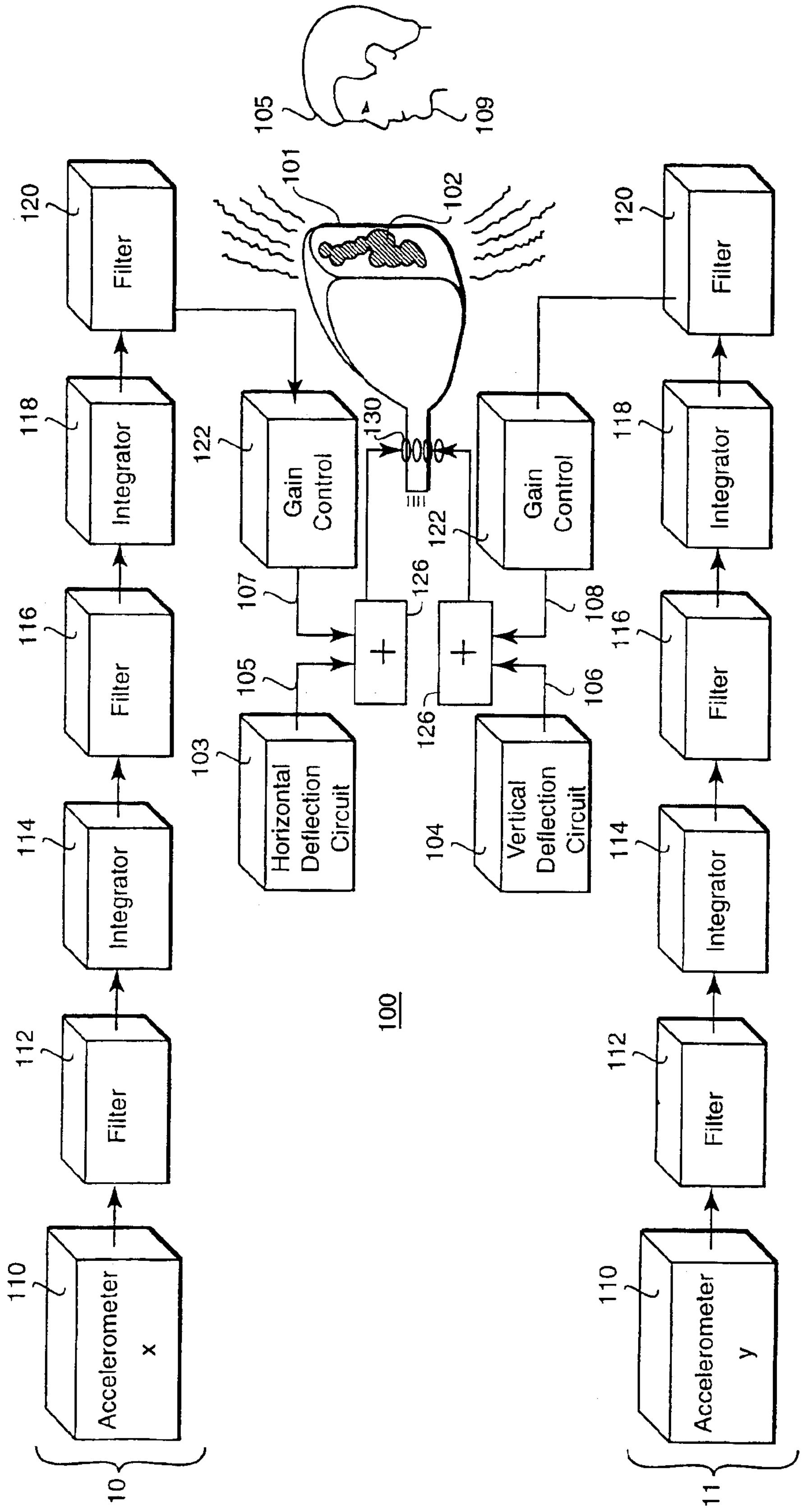
FIG. 1 is a block diagram of a display device according to a first embodiment of the invention.
Figure 2:
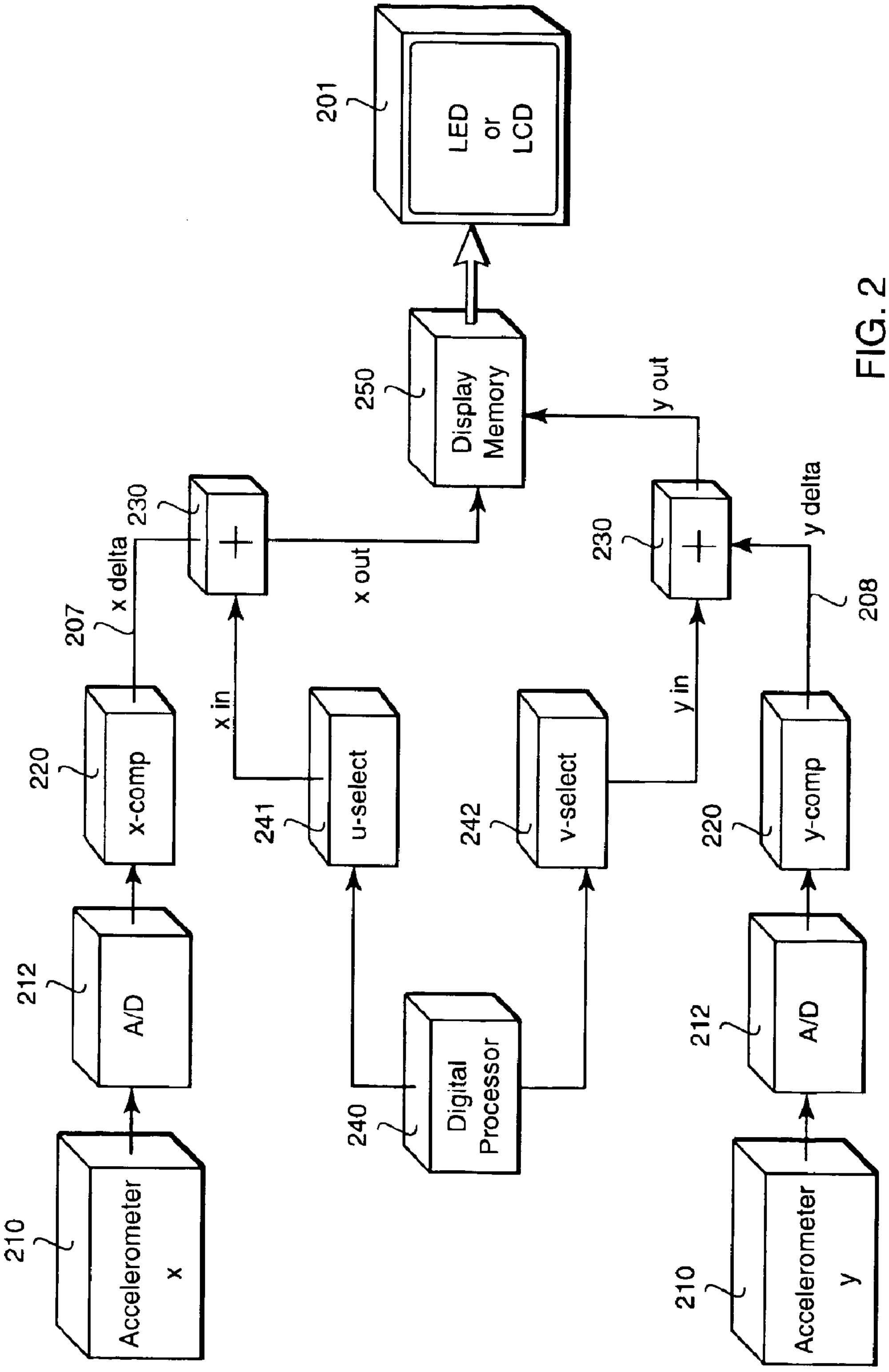
FIG. 2 is a block diagram of a display device according to a second embodiment of the invention.

FIG. 1 shows a preferred embodiment of a display device 100 that compensates for shaking and vibration. The display device is particularly suited for use in mobile environments, or in environments where there is a lot of vibration, for example display systems integrated into industrial machinery.

The display device 100 according to the invention includes a cathode ray tube (CRT) 101 that can display an image 102. The image is generated via horizontal and vertical deflection circuits 103–104. The deflection circuits can be derived from television signals, e.g., NTSC or HDTV, or via a display buffer and a graphics generator in a computer system, not shown.

The invention corrects for the shaking or vibration by using an x-motion compensation circuit 10 for a horizontal deflection signal ($H_{in}$) 105, and a y-motion compensation circuit 11 for a vertical deflection signal ($V_{in}$) 106. Each motion compensation circuit performs in a like manner.

The compensating signals are respectfully derived from accelerometers 110. The x- and y-accelerometers are mounted at right angles to each other and are coupled in a fixed relationship to the display screen. For example, they are mechanically attached to the display device 101, or the housing in which the CRT is mounted so that motion can be directly detected. The accelerometer can be implemented using the ADXL-202 from Analog Devices, Inc.

The output from each accelerometer 110 is passed through a first band-pass filter 112. The purpose of the first filter is to prevent signal drift due to zero-point (DC) errors. Therefore, the low-end cut-off of the band-pass filter blocks any frequencies less than one half cycle per second. Also, since the refresh rate for the image is typically limited to 30 or 60 frames per second, the high end cut-off of the filter blocks frequencies higher than the image refresh rate.

Next, the filtered signal is presented to a first integrator 114. The first integrator derives velocity from acceleration. The output from the first integrator can be passed through a second band-pass filter 116, particularly if a finite precision integrator is used. The output of the second integrator is presented to a second integrator 118 to derive position from velocity. The output of the second integrator can be passed through a third band-pass filter 120. The second and third filters can be like the first, and perform like functions, that is, to filter drift and low-frequency noise, and to have the sampled signal not exceed the Nyquist frequency of the display device.

The outputs of the third filters can be passed through optional gain control circuits 122 to respectively form x- and y-compensation signals ($H_{delta}$, $V_{delta}$) 107–108. The compensation signals are combined with the deflection signals in adders 126. The compensated deflection signals ($H_{out}$, $V_{out}$) are fed directly to the deflection coils 130 of the CRT 101.

The net effect of the compensation circuits is to hold the image 102 stable, with respect to the viewer 109, while the display device is shaken or subject to vibration such as is experienced in mobile applications or vibrating environments.

It should be noted that an additional z-motion compensation circuit can be added to account for shaking in the z-direction. In this case, the angular extent of the image, as perceived by the user, is held steady by adjusting the vertical and horizontal size signals as the display moves in and out.

In an alternative embodiment for digital devices, a display device 201 is a LED array or a LCD panel. In this type of display, pixels in a display memory 250 are selected by x- and y-address select signals derived from a digital processor 240. The compensation circuits here include accelerometers 210. The outputs of the accelerometers are converted to digital signals by the A/D converters 220. The remainder of the compensation circuits 220 operates as described above, except now using digital circuits to filter and integrate acceleration to obtain distance. The compensating x and y signals 207–208 are respectively added 330 to the select signals 241–242 to correctly address the display memory with motion compensation.

For example, if a pixel at [73, 107] would be the next pixel addressed under a steady state condition, and motion has caused the display to move by [+3, +5] pixel units, then the compensated address select signal is [76, 112]. That is, in general:

$$x_{out}=x_{in}+x_{delta} \text{ and } y_{out}=y_{in}+y_{delta},$$

where the delta values are the amount of motion. It may be necessary to interpolate between pixels when the movement is a fractional pixel distance.

Predictive Methods for Compensating for Shaking Displays

If the vibration is periodic, then it is possible to predict where the display will be located in near future times. Thus, it becomes possible to predetermine the compensation signals for a next frame while displaying a previous frame.

High Duty Cycle Displays

High duty cycle displays are those where each pixel is illuminated for most or all of the frame time. These include LCD and plasma displays. Using the accelerometer signals and a prediction method, first predict the relative display offset for the next frame time, see below for details on the predictive method. Translate the image in the frame buffer by the negative of this offset. It is best if the translation is performed on a sub-pixel basis, but this may be computationally expensive. Otherwise, round the offset to the nearest integer number.

Low Duty Cycle Displays

Low duty cycle displays are those where each pixel is illuminated for only a small part of the frame time. Such displays use the "persistence of vision" of the human eye to make the display seem to be continuously illuminated. These include LED displays. Using the accelerometer signals and the predictive method, first predict the relative display offset for the next frame time. Next, calculate when during the frame time the display will pass nearest to an even pixel boundary. Shift the frame buffer data by the appropriate offset to compensate for this. At the calculated instant, illuminate the display, usually by flashing the LEDs for the low duty cycle. This method can provide the effects of sub-pixel shifting without the computational expense of the calculation.

Figure 3:
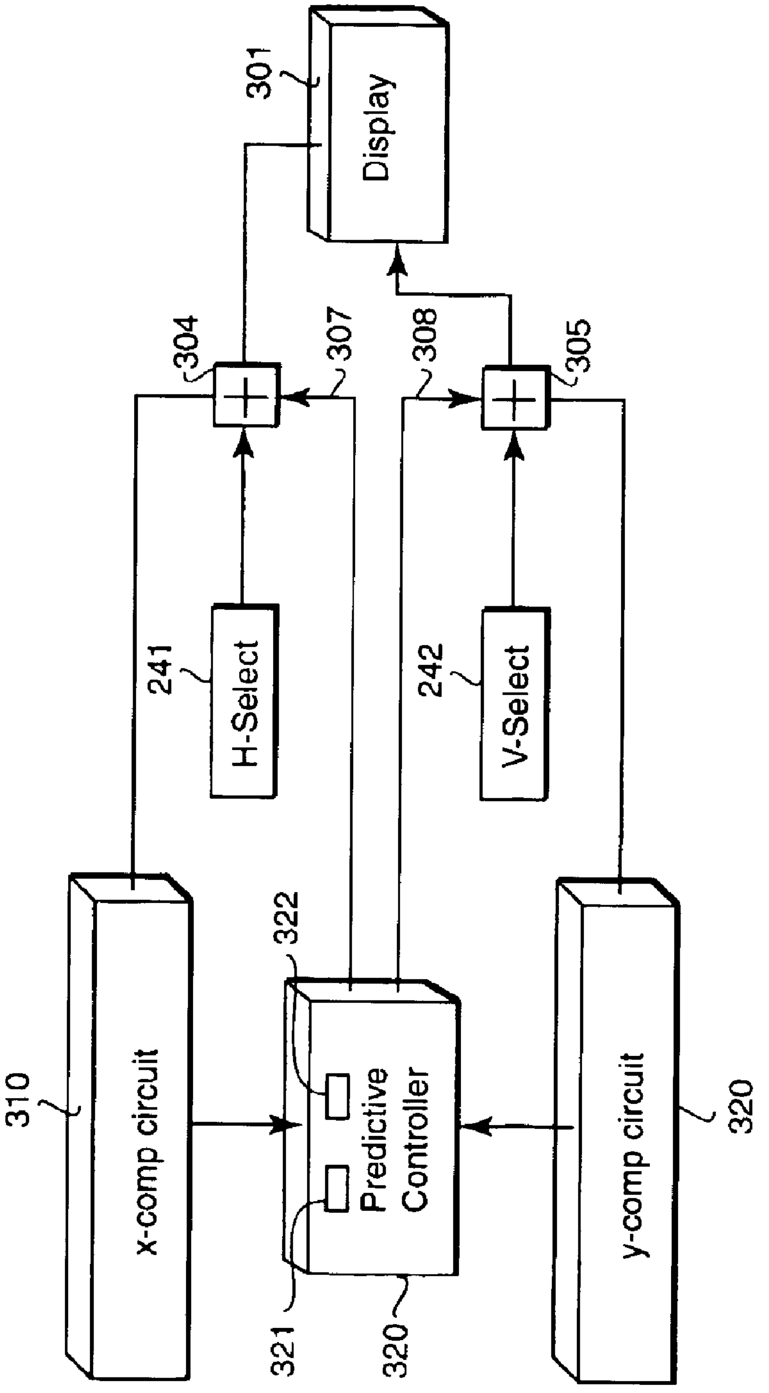
FIG. 3 is a block diagram of a display device according to a third embodiment of the invention.

FIG. 3 shows the embodiment where a predictive controller 320 is used to dynamically generate adaptive correction signals 307–308. In this case, the output of the compensation circuits 310, 320 is presented to the predictive controller 320. The signals are stored in a memory 321. The signals are analyzed over time to build a model 322 that predicts anticipated motion. This is particularly useful where the motion is repetitive, or faster than the refresh rate of the display device 301 because in this case, the compensation signals 307—307 for the adders 304–305 can be adjusted ahead of time using the model 322.

Predictive Method

Figure 4:
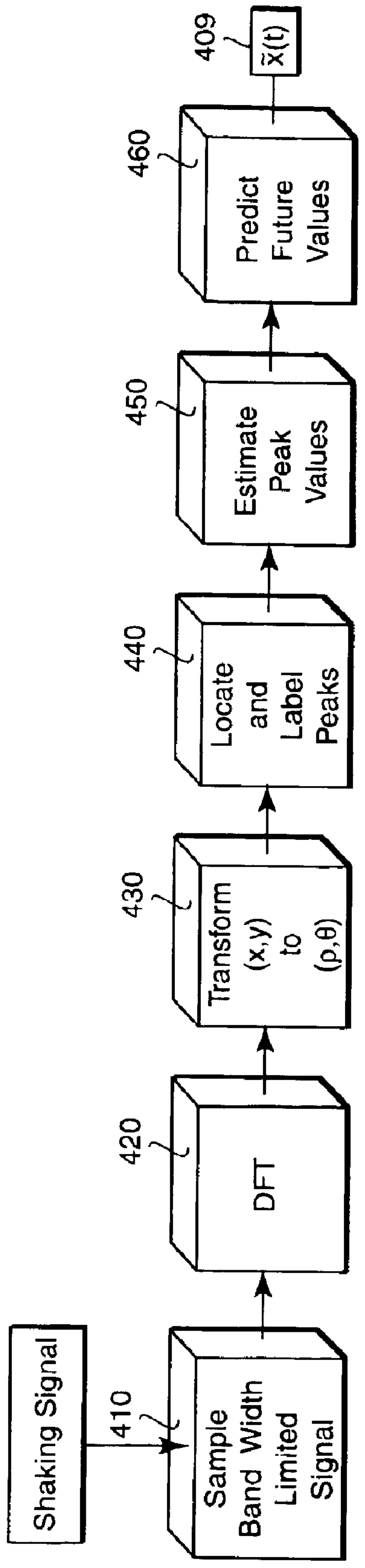
FIG. 4 is a flow diagram for a predictive method used by the device of FIG. 3.

Given that the shaking can be expressed as a bandlimited signal composed of multiple sinusoids and possibly noise, the following method, as shown in FIG. 4, allows the controller 320 to predict compensation signals for near future times.

In step 410, sample the bandlimited shaking signal 401. The sampling rate should be at least twice the highest frequency in the shaking signal in order to comply with the Nyquist sampling theorem. Collect at least N samples, where N is the sampling rate times the reciprocal of the lowest frequency of the bandlimited signal. Multiply the samples by a proper window function, such as a raised cosine.

In step 420, perform a discrete Fourier transform (DFT) on the windowed samples.

In step 430, convert the transformed samples, which are complex numbers, into polar coordinates. This yields the magnitude and phase of the spectrum of the original signal.

In step 440, locate all spectral peaks whose magnitude is above some predetermined threshold. The threshold can be chosen to be smaller than the allowable error of the desired prediction. If the noise statistics of the original samples are known, then the threshold should be set to be above the noise level at each bin to minimize the effect of the noise on the peaks. Label these peaks 1 through M.

In step 450, for each peak, find its magnitude "p", phase "θ" and frequency "$f$". If the noise statistics of the original samples are known, then estimate the values of "ρ," "θ," and "$f$" using standard probabilistic techniques such as Maximum Likelihood estimation, see Papoulis, *Probability, Random Variables and Stochastic Processes*, McGraw-Hill, Inc., Third Edition, pp. 260 et seq., 1991. Multiply "ρ" by a correction factor to compensate for attenuation caused by the window function. In step 460, using all of the triples "ρ," "S," and "$f$", determine:

$$x(t)=\sum_{i\to M}\{r_i\times\cos(2\times\pi\times f_i\times t+\theta_i)\},$$

where $\rho_i$, $\theta_i$ and $f_i$ are the parameters of the ith peak from step 440. The value x(t) 409 is an estimate of the original signal for times t during and after the original collection of samples. Time t=0 corresponds to the time of the first sample.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A display device including a display screen, and horizontal and vertical display signals, the horizontal and vertical display signals to render an image on the display screen, comprising:

a first and second accelerometers mechanically coupled to the display screen;

a first and second compensation circuits to convert acceleration in horizontal and vertical directions respectively to x- and y-compensation signals;

first and second adders combining the x- and y-compensation signals with the horizontal and vertical display signals to dynamically adjust a location of the image on the display screen while the display device is subject to movement; and a predictive controller to predetermine the compensation signals for a next frame while displaying a previous frame prior to the movement.

2. The display device of claim 1 wherein the display screen is a cathode ray tube and the compensation circuits operate in an analog mode.

3. The display device of claim 2 wherein the display signals are deflection signals for the cathode ray tube.

4. The display device of claim 1 wherein the display screen is a digital screen.

5. The display device of claim 4 wherein the display signals are address signals for a frame buffer of the digital screen.

6. The display device of claim 1 wherein each compensation circuit further comprises:

a first and second integrator to convert acceleration to position; and at least one band-pass filter.

7. The display device of claim 6 wherein a low frequency cut-off of the band pass filter is less than one half cycle per second, and a high frequency cut-off is less than a refresh rate of the display screen.

8. The display device of claim 1 wherein each compensation circuit includes a gain control circuit.

* * * * *